(No Model.) 3 Sheets—Sheet 1.

F. J. SCOTT.
FOUNDER'S MOLDING MACHINE.

No. 560,548. Patented May 19, 1896.

Witnesses.
A. H. Opsahl.
Frank D. Merchant.

Inventor.
Frank J. Scott
By his Attorney.
Jas. F. Williamson (No Model.)  
F. J. SCOTT.  
FOUNDER'S MOLDING MACHINE.

No. 560,548. Patented May 19, 1896.

Witnesses.  
A. H. Opsahl.  
Frank H. Merchant.

Inventor.  
Frank J. Scott  
By his attorney.  
Jas. F. Williamson (No Model.)  
3 Sheets—Sheet 3.

F. J. SCOTT.
FOUNDER'S MOLDING MACHINE.

No. 560,548.  Patented May 19, 1896.

Witnesses.  
C. F. Kilyre  
R. D. Merchant

Inventor,  
Frank J. Scott  
By his Attorney,  
Jas. F. Williamson

UNITED STATES PATENT OFFICE.

FRANK J. SCOTT, OF ST. PAUL, MINNESOTA.

FOUNDER'S MOLDING-MACHINE.

SPECIFICATION forming part of Letters Patent No. 560,548, dated May 19, 1896.

Application filed September 17, 1894. Serial No. 523,204. (No model.)

*To all whom it may concern:*

Be it known that I, FRANK J. SCOTT, a citizen of the United States, residing at St. Paul, in the county of Ramsey and State of Minnesota, have invented certain new and useful Improvements in Founders' Molding-Machines; and I do hereby declare the following to be a full, clear, and exact description of the invention, such as will enable others skilled in the art to which it appertains to make and use the same.

My invention relates to founders' molding-machines, and has for its object to provide an improved machine of this class.

To these ends my invention consists in the novel features of construction hereinafter fully described, and defined in the claim.

My machine is illustrated in the accompanying drawings, wherein, like letters referring to like parts—

Figure 1:
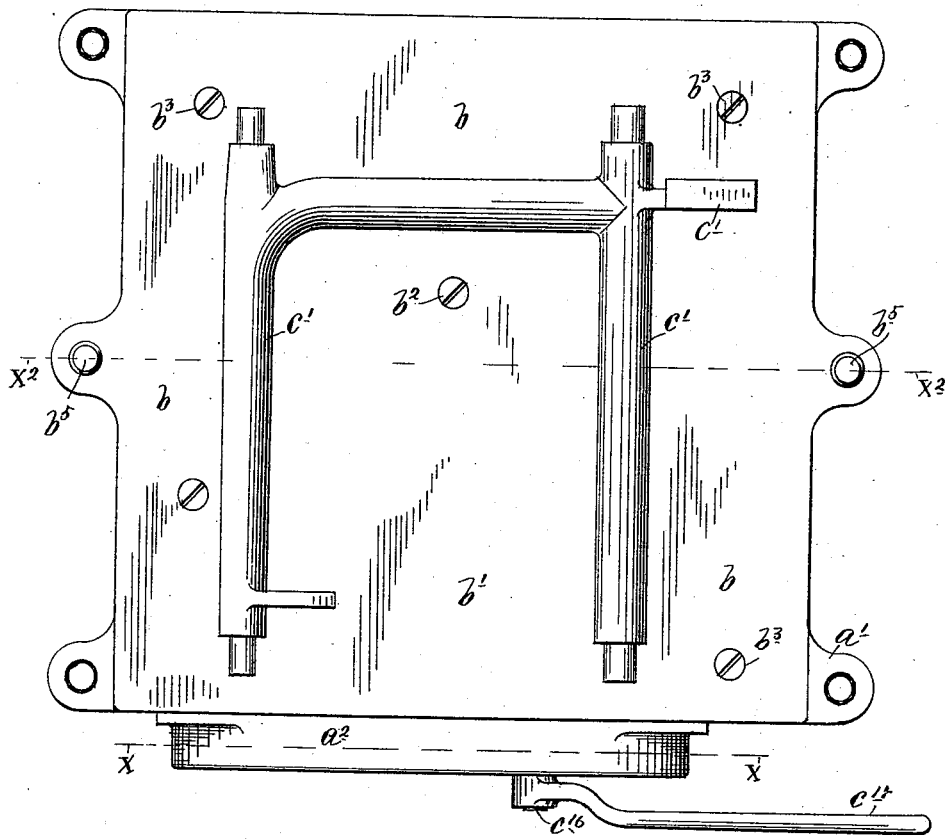
Figure 2:
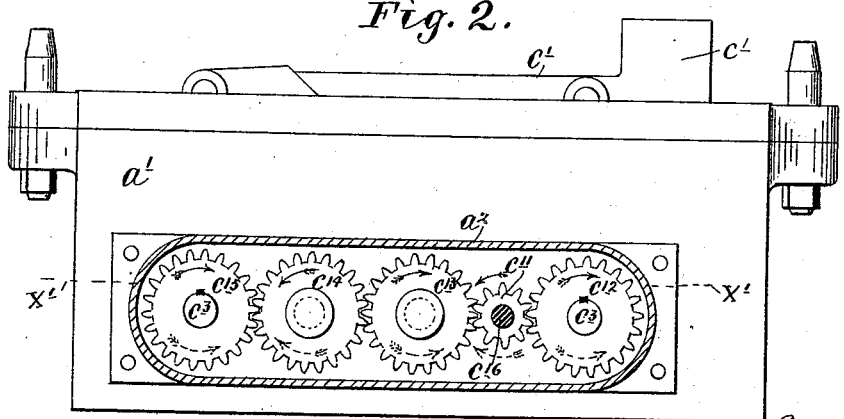
Figure 3:
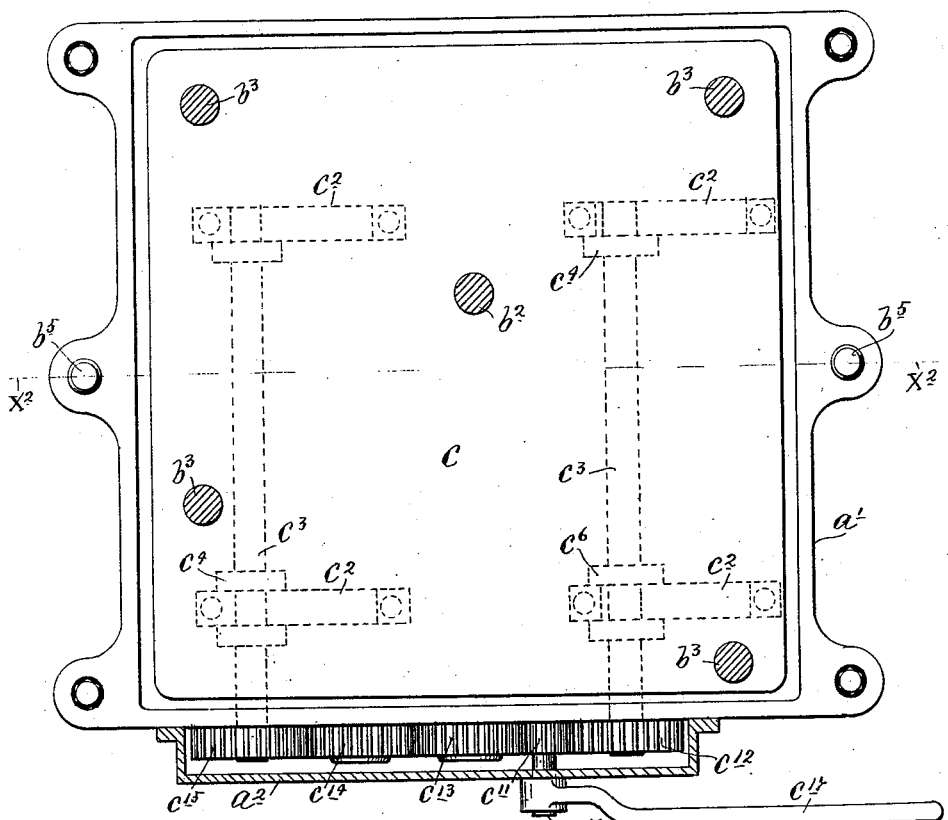
Figure 4:
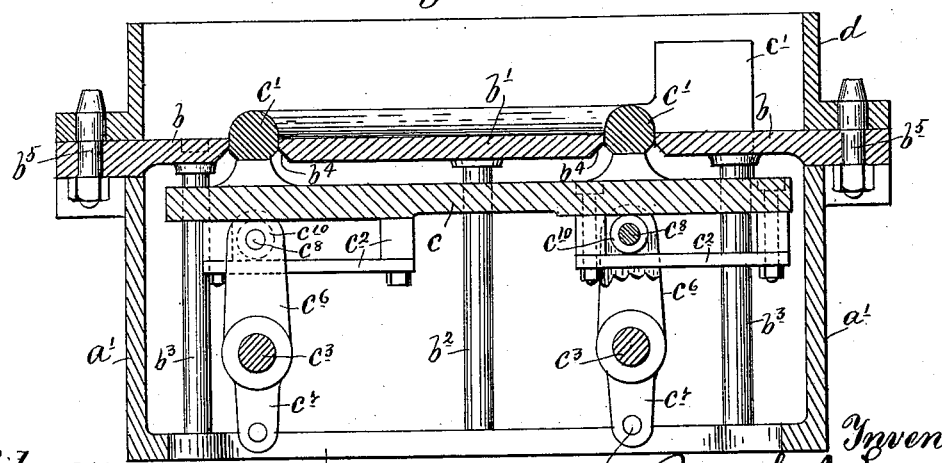
Figure 5:
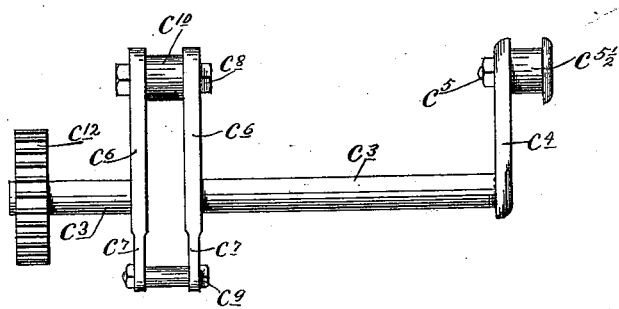

Figure 1 is a plan view of the machine with the flask removed. Fig. 2 is a view, chiefly in front end elevation, but partly in section, for exposing the gearing which operates the crank-shafts, the section being on the line X X of Fig. 1. Fig. 3 is a view, chiefly in plan, but partly in horizontal section, on the line X' X' of Fig. 2, showing the machine with the flask and stripper-plate and the pattern removed. Fig. 4 is a transverse vertical section through the machine on the line $X^2 X^2$ of Figs. 1 and 3 with all the parts in working position; and Fig. 5 is a detail in plan view, showing one of the crank-shafts detached.

Referring to the preferred construction, (shown in Figs. 1 to 5, inclusive,) $a$ represents the base-plate, and $a'$ the vertical walls or shell of a suitable frame for the operative parts of the machine. The base-plate $a$ is of skeleton-like form, or is otherwise provided with openings for the outward passage of the sand. To the top of the said frame is secured the outside section or portion $b$ of a stripper-plate $b\ b'$, the central section $b'$ of which is supported partially from the outside section $b$ and partially from one or more stool-posts $b^2$. The outside section $b$ is also reinforced by posts $b^3$, connecting the same with the base of the frame. All these posts $b^2\ b^3$ pass through and serve to guide a pattern-carrier $c$, which has fixed to the top thereof one or more pattern-pieces $c'$, which work through openings $b^4$, formed in the stripper-plate.

The stripper-plate section $b$ extends outward beyond the frame and is provided with suitable dowels $b^5$ for engagement with dowel-holes on one of the flask-sections $d$, which may be regarded as the drag.

The pattern-carrier $c$ has attached to the under or external side thereof runway or crank-pin brackets $c^2$. In suitable bearings fixed to the frame of the machine are mounted a pair of parallel crank-shafts $c^3$. Each of these shafts is provided at its rear end with a single crank $c^4$, having a pin with roller $c^{5\frac{1}{2}}$, engaging rear member of one of the pairs of brackets $c^2$. The said shafts are divided or composed of sections having parallel and adjacent bilateral crank-arms $c^6\ c^7$, which are connected at their outer ends by pins or tie-rods $c^8\ c^9$, respectively, the member $c^8$ of which carries a sleeve-roller $c^{10}$ and passes through the front member of the pair of coöperating brackets $c^2$ for that particular shaft. The other pin $c^9$ simply serves to assist in the connection of the shaft-sections and to avoid torsional strain thereon under the crank action. The two shafts $c^3$ extend outward through the front of the case or frame and are provided with gears $c^{12}\ c^{15}$. A small gear or pinion $c^{11}$ is in mesh on one side with the gear $c^{12}$ and on the other with an idle-gear $c^{13}$, which in turn is in mesh with the second idler $c^{14}$, which engages the gear $c^{15}$ on the other shaft $c^3$. The gear $c^{11}$ is rigid on a short shaft $c^{16}$ and is provided with a hand-lever $c^{17}$. The train of gears is protected by a suitable housing $a^2$.

Having regard to the action, if the parts be as shown in Figs. 1 and 4, the pattern will be set and all the parts ready for the filling of the flask with the sand and ramming the same into form. Whenever ready to draw the pattern all that is necessary is to throw the lever $c^{17}$ from the position shown in the drawings to an opposite extreme position, as thereby the crank-shaft $c^3$ will both be rocked in a direction opposite to that of the movement of the hand-lever $c^{17}$ or as shown by the full-line arrows in Fig. 2, and the pattern-carrier $c$, with the pattern $c'$, will be drawn down through the stripper-plate $b\ b'$. The runway-brackets $c^2$ permit the necessary motion to the crank-pins, and the double cranks connecting the shaft-sections afford clearance for the said brackets $c^2$, so as to permit the same to pass the axes of the shafts, if necessary, to effect the proper draw or obtain the necessary amount of vertical motion on the pattern and pattern-carrier. The pattern-carrier is held in absolutely true line movement by the guiding-posts $b^2$ $b^3$, over which it passes. The stripper-plate sections $b$ $b'$ also coöperate in the guiding action on the pattern $c'$. The draw of the pattern is therefore bound to be absolutely true and accurate. In raising the pattern-carrier $c$ for setting the pattern the gears turn, as shown by the dotted-line arrows in Fig. 2. The upward movement of the pattern and pattern-carrier is limited by the length of the cranks on the shafts $c^3$, which are made of the exact length required for properly setting the particular pattern in each case when the cranks are on the dead-centers in their uppermost position.

The particular pattern shown in Figs. 1, 2, and 4 is intended as a binder-frame pattern, and the machine is constructed for that particular pattern. In adapting the machine to other patterns changes would of course be made in the proportions and relative locations of the parts as occasion might require. If the shafts $c^3$ were sufficiently close together, for example, the idler $c^{13}$ and $c^{14}$ might be dispensed with in the train of gearing. It will also be understood that the crank-shafts $c^3$, with the slot-and-pin connections afforded by the bracket $c^2$, and the pins of the cranks would be equally available and advantageous if applied directly to a pattern, which in some forms of pattern would be the best way, or if applied to any other part which required movement to effect the draw of the pattern or pattern-pieces.

The machine herein disclosed is in the same line as the machine disclosed in my pending application executed by me of date August 31, 1894, and filed of date September 10, 1894, under Serial No. 522,576, bearing the same title.

Briefly stated, this machine, in the class of work to which it is applicable, will effect an economy of upward of fifty per cent. as compared with handwork.

What I claim, and desire to secure by Letters Patent of the United States, is as follows:

In a founder's molding-machine, the combination with a fixed stripper-plate, of a pattern-carrier guided for a true movement, runway-brackets secured to said carrrier and divided or sectional crank-shafts with the crank-pins working in said brackets and with certain of said cranks formed of bilateral parallel arms on the adjacent ends of the shaft-sections, both sets of which arms are connected by pins or cross-rods one of which works in one of said brackets and the other of which reinforces the shaft and prevents torsional strain thereon while permitting clearance for the brackets to pass the axes of the shaft, substantially as described.

In testimony whereof I affix my signature in presence of two witnesses.

FRANK J. SCOTT.

Witnesses:
JAS. F. WILLIAMSON,
EMMA F. ELMORE.